(12) United States Patent
Zee et al.

(10) Patent No.: US 8,897,131 B2
(45) Date of Patent: Nov. 25, 2014

(54) LTE CELL SPECIFIC REFERENCE SIGNAL BANDWIDTH REDUCTION

(75) Inventors: Oscar Zee, Stockholm (SE); Tomas Hedberg, Stockholm (SE); Jacob Österling, Järfälla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 182 days.

(21) Appl. No.: 13/394,674

(22) PCT Filed: Sep. 9, 2009

(86) PCT No.: PCT/EP2009/061703
§ 371 (c)(1),
(2), (4) Date: Mar. 7, 2012

(87) PCT Pub. No.: WO2011/029473
PCT Pub. Date: Mar. 17, 2011

(65) Prior Publication Data
US 2012/0170458 A1 Jul. 5, 2012

(51) Int. Cl.
*H04L 12/26* (2006.01)
*H04L 5/00* (2006.01)

(52) U.S. Cl.
CPC .............. *H04L 5/0048* (2013.01); *Y02B 60/50* (2013.01)
USPC .......................................... 370/232; 370/235

(58) Field of Classification Search
CPC .......................... H04L 47/125; H04Q 11/0478
USPC ......... 370/230, 230.1, 231–235, 237, 395.21, 370/395.4–395.41, 437, 465, 468, 252
See application file for complete search history.

(56) References Cited

U.S. PATENT DOCUMENTS

| | | | | |
|---|---|---|---|---|
| 7,289,467 | B2 * | 10/2007 | Bourlas et al. | 370/328 |
| 7,529,204 | B2 * | 5/2009 | Bourlas et al. | 370/328 |
| 7,860,058 | B2 * | 12/2010 | Suo et al. | 370/330 |

(Continued)

FOREIGN PATENT DOCUMENTS

WO 2009041871 A1 4/2009

OTHER PUBLICATIONS

3rd Generation Partnership Project. 3GPP TS 36.302, V8.2.0 (Jun. 2009). 3rd Generation Partnership Project; Technical Specification Group Radio Access Network; Evolved Universal Terrestrial Radio Access (E-UTRA); Services provided by the physical layer (Release 8). Jun. 2009.

(Continued)

*Primary Examiner* — Kevin Mew
(74) *Attorney, Agent, or Firm* — Murphy Bilak & Homiller PLLC

(57) ABSTRACT

A method and an arrangement for transmitting reference signals in a radio frame in a cellular communication system comprising at least one network node having a measurement bandwidth γ, which is more narrow than a full downlink bandwidth β of said network node. Subframes only carrying reference signals, which are to be transmitted from said network node may be transmitted over a temporarily reduced transmission bandwidth α, which is at least equally wide as the measurement bandwidth Y provided by the network node, and more narrow than the full downlink bandwidth β of the network node. The use of a reduced transmission bandwidth leads to that less reference signals are transmitted, and thereby transmission power will be saved.

32 Claims, 12 Drawing Sheets

(56) References Cited

U.S. PATENT DOCUMENTS

| | | | |
|---|---|---|---|
| 7,983,367 B2* | 7/2011 | Landau et al. | 375/346 |
| 8,243,665 B2* | 8/2012 | Lee et al. | 370/329 |
| 8,406,790 B2* | 3/2013 | Kazmi et al. | 455/456.1 |
| 8,537,757 B2* | 9/2013 | Arviv et al. | 370/328 |
| 2002/0080816 A1* | 6/2002 | Spinar et al. | 370/449 |
| 2005/0089064 A1* | 4/2005 | Zimmerman et al. | 370/468 |
| 2006/0146863 A1* | 7/2006 | Spinar et al. | 370/468 |
| 2009/0175235 A1* | 7/2009 | Spinar et al. | 370/329 |
| 2009/0225776 A1* | 9/2009 | Zimmerman et al. | 370/468 |
| 2010/0296410 A1* | 11/2010 | Kazmi et al. | 370/252 |
| 2011/0319025 A1* | 12/2011 | Siomina et al. | 455/63.1 |

OTHER PUBLICATIONS

Tanno, M., et al. "Evolved UTRA—Physical Layer Overview." IEEE 8th Workshop on Signal Processing Advances in Wireless Communications, Helsinki, Finland, Jun. 17-20, 2007.

* cited by examiner

| Total # symbols / radio frame | 168000 | | | |
|---|---|---|---|---|
| Traffic load [%] | User data [# symbols / radio frame] | User data [% total # symbols / radio frame] | Control signal [# symbols / radio frame] | Control signal [% total # symbols / radio frame] |
| 0% | 0 | 0% | 40000 | 23.8% |
| 12.5% | 12600 | 7.5% | 43400 | 25.8% |
| 25% | 25200 | 15% | 46800 | 27.9% |
| 37.5% | 37800 | 22.5% | 50200 | 29.9% |
| 50% | 50400 | 30% | 53600 | 31.9% |
| 62.5% | 63000 | 37.5% | 57000 | 33.9% |
| 75% | 75600 | 45% | 60400 | 36.0% |
| 87.5% | 88200 | 52.5% | 63800 | 38.0% |
| 100% | 100800 | 60% | 67200 | 40% |

Figure 16

| Total # symbols / radio frame | 168000 | | | |
|---|---|---|---|---|
| Traffic load [%] | User data [# symbols / radio frame] | User data [% total # symbols / radio frame] | Control signal [# symbols / radio frame] | Control signal [% total # symbols / radio frame] |
| 0% | 0 | 0% | 36400 | 21.6% |
| 12.5% | 12600 | 7.5% | 40400 | 24.0% |
| 25% | 25200 | 15% | 44400 | 26.4% |
| 37.5% | 37800 | 22.5% | 48400 | 28.8% |
| 50% | 50400 | 30% | 53400 | 31.8% |
| 62.5% | 63000 | 37.5% | 56400 | 33.6% |
| 75% | 75600 | 45% | 60400 | 36.0% |
| 87.5% | 88200 | 52.5% | 63800 | 38.0% |
| 100% | 100800 | 60% | 67200 | 40% |

Figure 17

LTE CELL SPECIFIC REFERENCE SIGNAL BANDWIDTH REDUCTION

TECHNICAL FIELD

The invention relates to a method and an arrangement in a telecommunication system, in particular to a method and an arrangement, which enable a reduction of the amount of reference symbols transmitted during low and moderate traffic loads.

BACKGROUND

Energy savings is an important issue in many organisations today, both for economical and environmental reasons. Many organisations have set up goals concerning how much the direct and indirect CO2 emissions should be reduced in the years to come. For organisations supplying network elements for telecommunication systems, a large part of the indirect carbon-related emissions take place in the user phase.

Further, it is desired to reduce the interference in communication systems, which may be addressed e.g. by reducing transmission power.

For example, wireless network nodes such as e.g. radio base stations or relays, consume a considerable amount of energy when transmitting information to other network elements. The Radio Unit (RU) of a base station, which performs the transmissions, uses a considerable part of the total consumed power of the base station. A RU comprises one or more transmitters, each of which in turn comprises one or more Power Amplifiers (PAs). A PA in an average base station has an output power of approximately 20 W and an efficiency level of around 20%, which means that approximately 100 W are needed in order to obtain an output power of 20 W from a PA. Considering the amount of network nodes transmitting 24 h/day, 365 days/year in a communication system, it is apparent that even small improvements in the transmission power efficiency of a network node may have a notable impact on the total amount of consumed power in a large perspective.

It is comprehensible that a great amount of energy is consumed in a network node during the busy hours of the day, when the network or cell has a high load level. However, it is perhaps not as evident that as much as up to 23.8% of the maximum power consumed in a network node during the busy hours, also is consumed during periods when the network or cell load is zero. The reason for this is that control information is transmitted by a network node also when there is no traffic load in the network or cell. The table in FIG. 16, shows an example of the percentage of user data and control signals, respectively, in an LTE (Long Term Evolution) radio frame at different traffic loads. In the example, an LTE cell with 20 MHz system bandwidth, 1 TX (transmission) antenna and 3 PDCCH (Physical Downlink Control Channel) symbols per subframe, is assumed. It can be seen in the table in FIG. 16 that at maximal traffic load, the control signalling represents 40% of the total amount of symbols per radio frame. At zero traffic load, the control signalling represents 23.8% of the total amount of symbols per radio frame, which implies that 23.8% of the total transmission power used when transmitting a subframe at maximum traffic load in the LTE network node is consumed at zero traffic load, as stated earlier.

Thus, control signalling consumes a considerable amount of energy also during periods of low to moderate traffic load. A considerable part of the amount of cells in a network will have a low to moderate traffic load during a considerable part of the time. Further, the relatively high transmission power levels during low to moderate traffic loads contribute to the interference level in the network. This leaves room for further improvements.

SUMMARY

It would be desirable to obtain a mechanism for decreasing the power consumption in a network node, for e.g. environmental and economical reasons. It is an object of the invention to address at least some of the issues outlined above. Further, it is an object of the invention to provide a mechanism, for enabling a reduction of the amount of reference signals transmitted in a network node. These objects may be met by a method and arrangement according to the attached independent claims.

According to one aspect, a method of transmitting reference signals in a radio frame is provided in a cellular communication system comprising a first network node having a measurement bandwidth $\gamma_f$, which is more narrow than a full downlink bandwidth $\beta_f$ of the first network node. The method comprises determining whether a subframe to be transmitted by the first network node will be carrying only reference signals or not. If the subframe is to carry only reference signals, the transmission bandwidth is reduced to a temporarily reduced transmission bandwidth $\alpha$ during the transmission of the subframe. The temporarily reduced transmission bandwidth $\alpha$ should be at least equally wide as the measurement bandwidth $\gamma_f$, and more narrow than the full downlink bandwidth $\beta_f$ of the first network node.

According to another aspect, an arrangement is adapted to transmit reference signals in a radio frame in a cellular communication system, which comprises a first network node providing a measurement bandwidth $\gamma_f$, which is more narrow than a full downlink bandwidth $\beta f$ of the first network node.

The arrangement comprises a determining unit, which is adapted to determine whether a subframe to be transmitted by the network node will be carrying only reference signals. If the subframe is found to be carrying only reference signals, a control unit reduces the transmission bandwidth to a temporarily reduced transmission bandwidth a during transmission of the subframe. The temporarily reduced transmission bandwidth a should be at least equally wide as the measurement bandwidth $\gamma_f$, and more narrow than the full downlink bandwidth $\beta_f$ of the first network node.

The above method and arrangement may be used to reduce the amount of reference symbols which are transmitted in subframes only carrying reference signals, and thereby save some of the transmission power which would have been used if reference symbols would have been transmitted over the full downlink bandwidth β also in subframes only carrying reference signals. Further, the above method and arrangement may reduce the interference level for transmissions coinciding with a subframe transmitted with a temporarily reduced transmission bandwidth α, due to the reduced transmission power.

The above method and arrangement may be implemented in different embodiments. A network node may obtain information on the full downlink bandwidth $\beta_s$ and/or the measurement bandwidth $\gamma_s$ provided in a second network node neighbouring the first network node, and may also notify a neighbouring node of the full downlink bandwidth $\beta_f$ and/or the measurement bandwidth $\gamma_f$ used in the own network node or cell.

In one embodiment, the measurement bandwidth γf provided by a network node is set to a value less than or equal to the most narrow of i) the full downlink bandwidth $\beta_f$ of the network node, and ii) the full downlink bandwidth $\beta_s$ of neighbouring network nodes, and iii) the measurement bandwidth $\gamma OP$, where $\gamma OP$ is a preconfigured value, which may be set by the operator. In one embodiment, this preconfigured measurement bandwidth $\gamma OP$ is approximately 5 MHz.

In one embodiment, the temporarily reduced transmission bandwidth $\alpha$ in a first network node could be set to be at least equally wide as the widest bandwidth of i) the measurement bandwidth $\gamma_f$ of the first network node, and ii) the measurement bandwidth $\gamma_s$ of a neighbouring network node.

These embodiments achieve that the measurement bandwidth $\gamma$ in a cell is always equal to or more narrow than the full downlink bandwidths $\beta_i$ of the cell and its neighbouring cells. The embodiments further achieve that the temporarily reduced transmission bandwidth a in a cell is always wider than or equal to the measurement bandwidths $\gamma_i$ in the cell and its neighbouring cells. These general rules for setting $\gamma$ and $\alpha$ are advantageous when applying the method in a network comprising cells having a full downlink bandwidth $\beta$, which is more narrow than $\gamma OP$, and cells which are not able to apply the method.

In another embodiment, a subframe only carrying reference signals is only transmitted over a temporarily reduced transmission bandwidth $\alpha$ if the subframe precedes another subframe, which only carries reference signals.

This embodiment achieves that a mobile terminal will be able to perform measurements over the full downlink bandwidth $\beta$ during at least one subframe before receiving user data or control signalling other than reference signals, and thereby obtain channel estimates of a quality which enables the mobile terminal to receive the data or control signalling in a reliable way.

In one embodiment, the system control information other than reference signals is concentrated to a predetermined number of subframes of a radio frame. The predetermined number of subframes could be e.g. two, according to one embodiment. Concentrating the control information maximises the amount of subframes which only carry reference signals.

In one embodiment, a mobile terminal to be scheduled to receive data is preferably scheduled in subframes already comprising information other than reference signals. If there are no resources left to allocate in the subframes already comprising information other than reference signals, the mobile terminal is scheduled in a subframe, which is adjacent to a subframe already comprising information other than reference signals.

This results in clusters of subframes carrying information other than reference signals, and thereby maximises the amount of consecutive subframes which only carry reference signals. This is beneficial e.g. in embodiments where a subframe only carrying reference signals must precede another subframe only carrying reference signals in order to be transmitted over a temporarily reduced transmission bandwidth $\alpha$.

In some embodiments, the scheduling scheme in a cell takes the scheduling schemes in neighbouring cells into account. The scheduling scheme in a first network node may for example schedule user data destined to a mobile terminal in a first subframe, coinciding in time with a second subframe carrying no information other than reference signals, which is transmitted by a neighbouring network node.

This concept may be further developed by scheduling mobile terminals in consecutive subframes in descending or ascending order, starting from a subframe carrying information other than reference signals in a first cell and a second cell neighbouring said first cell, respectively.

These scheduling strategies utilise the fact that the interference experienced from a neighbouring cell is lower when the neighbouring node transmits subframes that only carry reference signals over a reduced bandwidth.

In one embodiment, the capacity of a subframe is fully utilised by refraining from scheduling a mobile terminal, until the amount of information other than reference signals destined to the mobile terminal fills a subframe, i.e. requires all the remaining free resources in the subframe. This maximises the amount of subframes which only carry reference signals.

In one embodiment, the method is only applied in a network node having a current traffic load, which is below a predetermined threshold.

In one embodiment, CQI reports received from mobile terminals are adjusted or suppressed, since they may be corrupt if the amount of subframes transmitted over a temporarily reduced transmission bandwidth $\alpha$ is too high.

The above embodiments have basically been described in terms of a method. However, the described arrangement has corresponding embodiments where the different units are adapted to carry out the above described method embodiments.

BRIEF DESCRIPTION OF THE DRAWINGS

The invention will now be explained in more detail by means of exemplary embodiments and with reference to the accompanying drawings, in which:

FIG. 16 is a table showing the relation between user data and control signals per radio frame at different traffic loads according to the prior art.

FIG. 17 is a table showing the relation between user data and control signals per radio frame when applying an embodiment of the invention.

DETAILED DESCRIPTION

Figure 1:
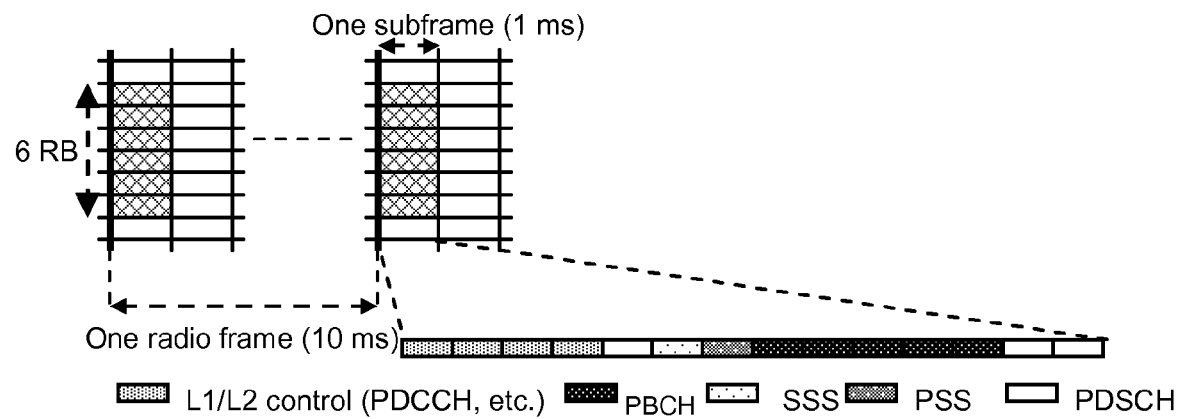
FIG. 1 illustrates an allocation of different channels in a downlink of an LTE network node according to the prior art.

Briefly described, a solution is provided for enabling a reduction of the transmission power of a network node, such as e.g. a base station, especially during low and moderate traffic loads, i.e. when the load on the network node is below its maximum. This is accomplished by reducing the amount of control signalling in a certain way, which will be described in more detail below.

Throughout this document, different subframes carrying different information will be discussed. In order to simplify the language and formulations in this document, the discussed subframes carrying different information are defined as being of one of the types a-, b-, or c-subframes, as follows:
a-subframe is a subframe comprising other information in addition to reference signals, e.g. user data and/or control information other than reference signals;
b-subframe is a subframe comprising only reference signals, which are transmitted over approximately the full downlink bandwidth of the cell in which the subframe is transmitted;
c-subframe is a subframe comprising only reference signals, but unlike a b-frame, being transmitted over a temporarily reduced transmission bandwidth, which will be defined below.

Further in this document, different bandwidths will be discussed, which will be denoted as follows:
$\alpha$=temporarily reduced transmission bandwidth in a cell, used when transmitting c-subframes.
$\beta$=full or total downlink bandwidth of a cell.
$\gamma$=local measurement bandwidth provided by a network node in a cell. $\gamma$ could also be referred to as the allowed measurement bandwidth within a cell, or the allowedMeasBandwidth.
$\gamma_{Default}$=default or conventional measurement bandwidth, provided by a network node in a cell if it is not instructed otherwise.
$\gamma OP$=preconfigured measurement bandwidth, which is set centrally e.g. by the operator of a network.

The full downlink bandwidth $\beta$ of a cell is set by the operator of a network and is distributed to network nodes in the cell and mobile terminals camping on the cell as a parameter in the MIB.

The measurement bandwidth $\gamma$ in a cell is distributed to mobile terminals camping on the cell in the SIB (System Information Block), e.g. in SIB3 and SIB5. For a network node not using the invention, the measurement bandwidth $\gamma$ is set by the operator to $\gamma_{Default}$. The measurement bandwidth $\gamma_{Default}$ is typically set to equal the most narrow of the full downlink bandwidths $\beta_i$ of a current cell and its neighbouring cells.

The use of the parameters $\beta$, $\gamma$ and a without an index refers to these parameter in one cell, or to the parameters in a general meaning. The parameters $\beta_i$, $\gamma_i$ and $\alpha_i$, i.e. with an index $_i$, is used to clarify that parameters of more than one cell is referred to. $\beta_i$ may for example refer to the full downlink bandwidths of a current cell and the cells neighbouring the current cell, or only refer to the full downlink bandwidths of the cells neighbouring the current cell. In certain passages where it is of extra importance that it is clear to a reader which parameter that is referred to, the indexes $_{f, s, A, B, C, D}$ and $_E$ are used, where f stands for first, s stands for second, and A-E stands for the cell indicated using the same respective letter in FIG. 10.

At zero traffic load, i.e. when no user data is transmitted by a network node in a cell, more than 50% of the subframes may comprise Reference Signals only. The Reference Signals are used by mobile terminals for channel estimation for reception of user data, and for handover decisions. If no user data is transmitted in a cell, the channel estimation for reception of user data is not needed. However, channel estimation for handover decisions is still needed, since there may be mobile terminals in neighbouring cells, which evaluate the cell for handover. Channel estimation for handover decisions are made over a certain bandwidth, which is common to a current cell and its neighbouring cells. This bandwidth is called the measurement bandwidth. The reason why a current cell and its neighbouring cells should agree on a measurement bandwidth is that it is easier for a mobile terminal camping on one of the cells to compare the different cells in handover evaluations when the channel estimates for the different cells are based on measurements on comparable frequency bandwidths. A current cell and its neighbouring cells may have different total downlink bandwidths $\beta_i$, for example 10 MHz, 15 MHz or 20 MHz, respectively. In order to enable comparison of the cells, the measurement bandwidth $\gamma$ is set to a bandwidth, which is common to the current cell and its neighbouring cells.

In one example with a current cell and two neighbouring cells having total downlink bandwidths of 10 MHz, 15 MHz and 20 MHz, respectively, the measurement bandwidth could be no wider than the full downlink bandwidth of the most narrow one of the full downlink bandwidths, in this case 10 MHz. For cells with a total downlink bandwidth $\beta$, which exceeds the measurement bandwidth $\gamma$, it would therefore be possible to reduce the transmission bandwidth for subframes only carrying reference signals. Such a reduction of the transmission bandwidth would reduce the amount of reference signals which are to be transmitted by a network node, which in turn would reduce the transmission power consumed in the network node.

The downlink information transmitted by a network node, such as e.g. by a base station in a cell, can roughly be divided into two categories: user data and control signals. The user data, sometimes called the pay-load, is the data requested by a user and sent to a user. For LTE, the user data is transmitted on the Physical Downlink Shared Channel (PDSCH). The control signals comprise information needed in order to maintain a communication between a mobile terminal, or User Equipment (UE), and a radio network. For LTE, the control signals comprise Reference Signals, Synchronisation Signals, Physical Broadcast Channel (PBCH) comprising the MIB (Master Information Block), Physical Downlink Control Channel (PDCCH) and Physical Downlink Shared Channel (PDSCH) where broadcast information, such as SIBs (System Information Blocks) is transmitted.

The structure of a conventional LTE radio frame will now be described in connection with FIGS. 1,2,3a and 8.

Figure 8:
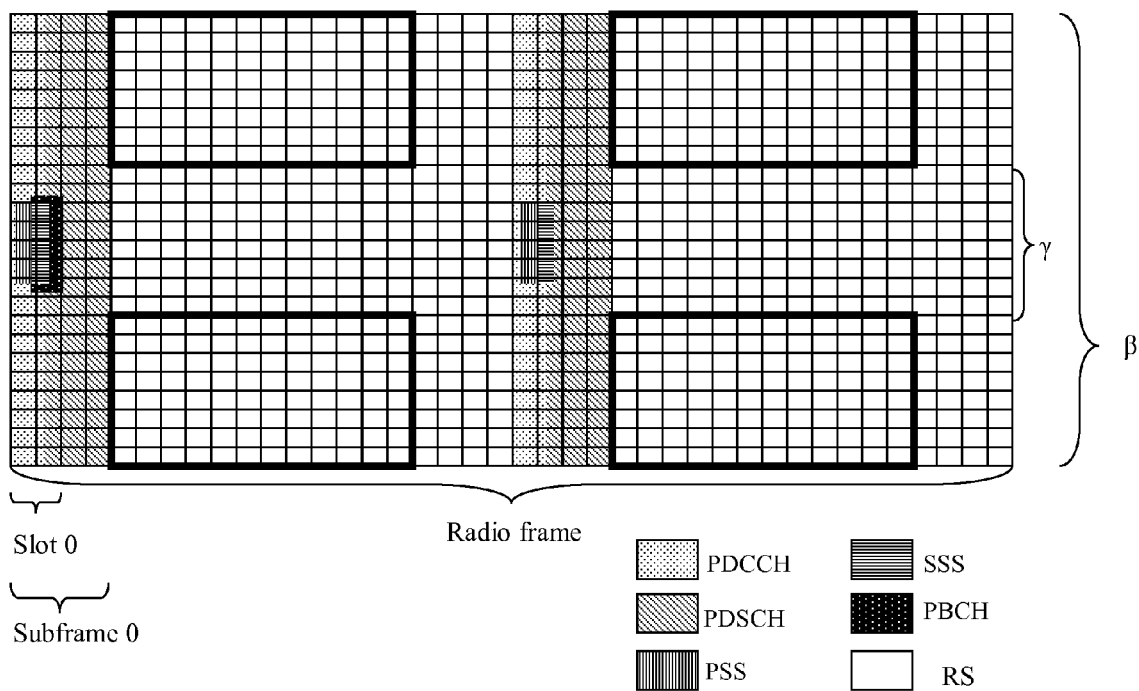
FIG. 8 illustrates an allocation of different channels in a radio frame in a downlink of an LTE network node, and which areas of the radio frame that would become silent when applying an embodiment of the invention.

Currently, in an LTE cell, the following control signals are typically transmitted in a radio frame in order to maintain the communication:
Synchronisation Signals
    Primary and secondary synchronisation signals (PSS and SSS) (3GPP TS 36.211) are transmitted in the centre of the downlink bandwidth as illustrated in FIG. 8 in slot 0 and slot 10 of the radio frame, i.e. in subframes 0 and 5. The different parts of a radio frame will be further described below and in connection with FIGS. 1-3a.
Pilot Signals
    Reference signals (3GPP TS 36.211) are transmitted over approximately the full downlink bandwidth, and are used for channel estimation for reception of PDCCH and PDSCH, and for handover decisions (3GPP TS 36.214).
Broadcast Data
    PBCH is transmitted in the centre of the downlink bandwidth in slot 0 as illustrated in FIG. 8, and comprises the MIB (Master Information Block) (3GPP TS 36.211 and 3GPP TS 36.300). The MIB comprises information, which gives a mobile terminal essential physical layer information of a cell, which is required in order for the mobile terminal to receive further system information.

PDCCH (and transport channel DL-SCH), which are transmitted in certain subframes, (3GPP TS 36.331, 3GPP TS 36.300, 3GPP TS 36.211) and comprise information, which indicate to UEs when to find certain information, i.e. SIBs (System Information Blocks), carried on the logical channel BCCH, on the PDSCH.

The SIBs are allocated as follows:
  SIB1 is transmitted in subframe 5 every second radio frame, i.e. at an interval of 20 ms.
  The other SIBs are freely scheduled by the RRC (Radio Resource Control)

An LTE radio frame has a duration of 10 ms, and comprises 10 subframes, each of 1 ms duration. Examples of LTE subframes are illustrated in e.g. FIGS. 1, 2 and 3a. Each subframe comprises 2 slots of 0.5 ms duration and each slot comprises 7 OFDM symbols, i.e. a subframe comprises 14 OFDM symbols. A constellation of 12 OFDM sub-carriers of 15 kHz in the frequency domain and a duration of 1 ms is referred to as a Resource Block (RB). The unit of 1 OFDM sub-carrier with a duration of one OFDM symbol is referred to as a Resource Element (RE). FIG. 1 illustrates the allocation of system information in LTE downlink. As can be seen in FIG. 1, the first subframe of a radio frame comprises system information, such as L1/L2 control, PBCH (Physical Broadcast Channel), Primary Synchronisation Signal (PSS), Secondary Synchronisation Signal (SSS), and the PDSCH (Physical Downlink Shared CHannel), to which a part of the system information may be mapped. The first four OFDM symbols, which are used for L1/L2 control comprise the PDCCH (Physical Downlink Control Channel), the PHICH (Physical HARQ Indicator Channel) and the PCFICH (Physical Control Format Indicator Channel). The part of the system information, which is mapped on the PDSCH is sometimes denoted the dynamic BCH or D-BCH.

Figure 2:
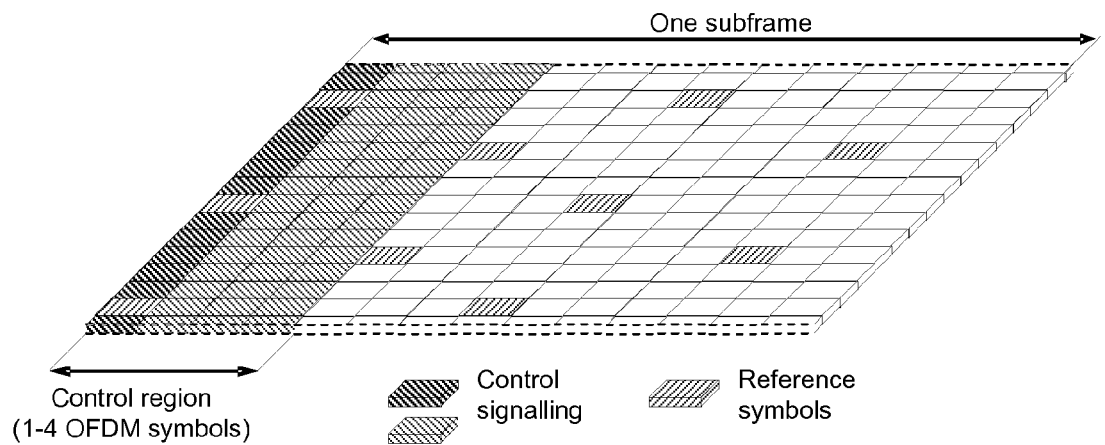
FIG. 2 illustrates the physical resource element mapping in a downlink of an LTE network node according to the prior art.
Figure 3A:
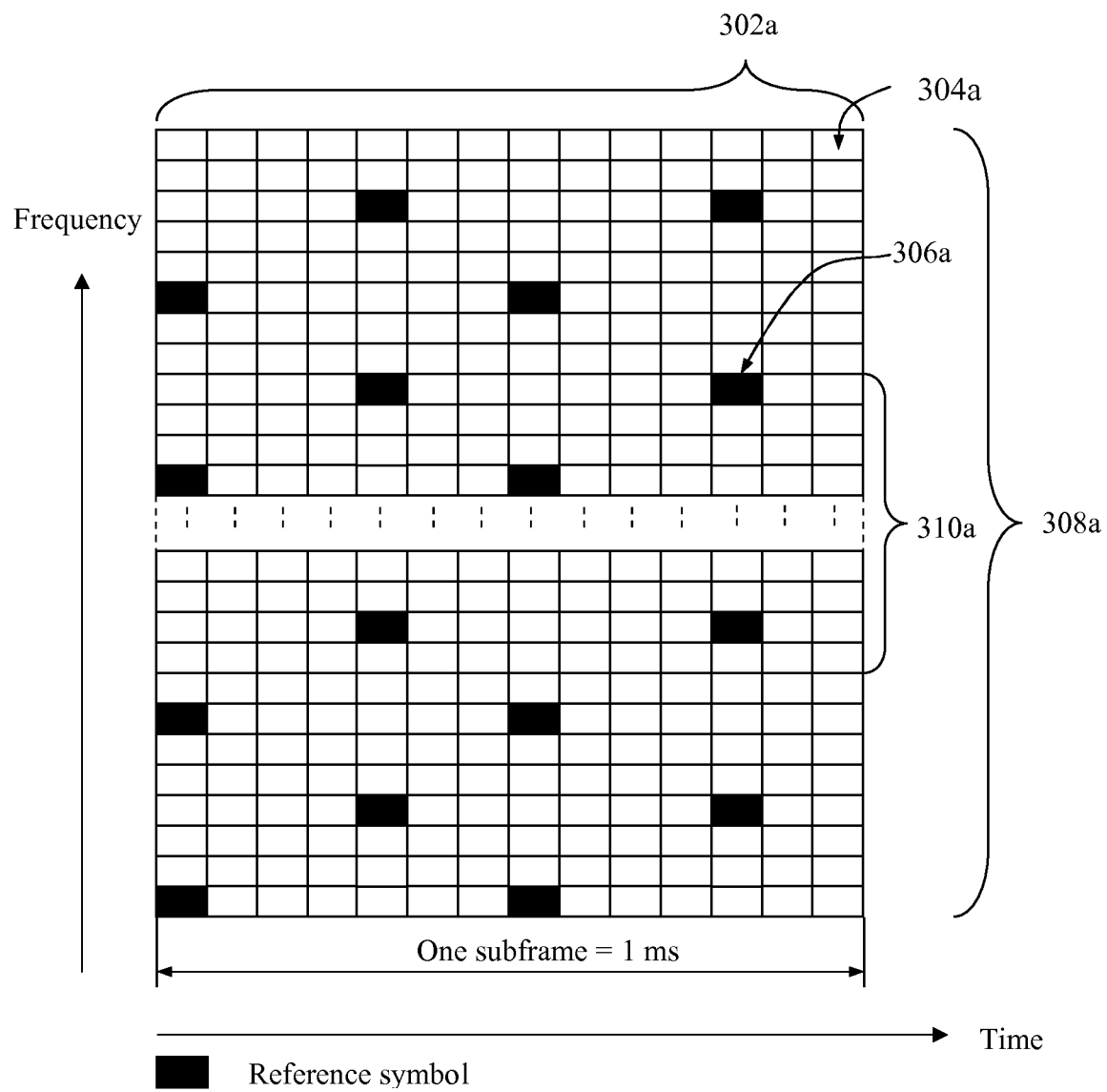
FIG. 3a illustrates how reference symbols are distributed in a subframe in a downlink of an LTE network node according to the prior art.

Reference Signals comprise Reference Symbols, which are allocated in predetermined resource elements spread over a radio frame. The reference symbols are, as stated earlier, used for enabling channel estimation for reception of data or for handover decisions. In FIG. 2, which illustrates a subframe of an LTE radio frame, it can be seen how the reference symbols are distributed over the resource elements of the subframe. The distribution of reference symbols over an LTE subframe is also illustrated in FIG. 3a, which shows a so-called b-subframe 302a, which only carries reference signals. Further, resource elements 304a are illustrated, of which certain predetermined ones 306a carry the reference signals. The full downlink bandwidth β of the subframe is illustrated as 308a, and the measurement bandwidth γ as 310a. FIG. 3a also illustrates that the reference signals are distributed over approximately the full downlink bandwidth β, since there may be frequency bands at the edge of the downlink bandwidth in which no reference symbols are allocated.

It should be noted that the exact structure of the radio frames and the mapping of control and data channels onto the radio frames is an ongoing work in 3GPP. Hence, the description provided in this text is used merely as an example in order to further enhance the reader's understanding of the invention, and it should be understood that variations in the radio frame structure may occur, with the invention being equally applicable to systems with radio frames with a structure other than the exact one described here.

Returning now to the concept of temporarily reducing the downlink transmission bandwidth during transmission of subframes carrying only reference signals, which will be described in more detail below in connection with FIG. 3b.

Figure 3B:
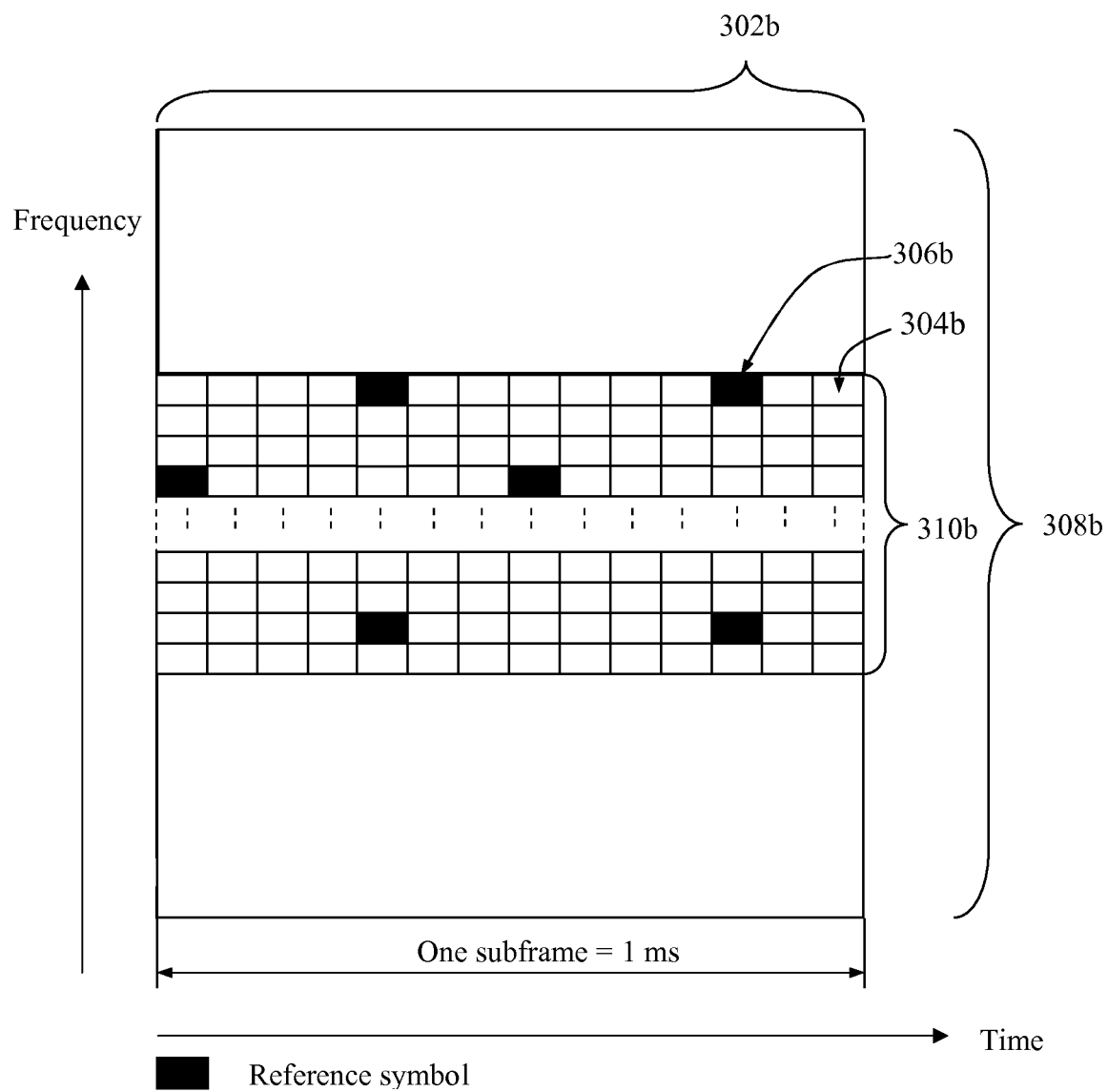
FIG. 3b illustrates how reference symbols are distributed in a subframe transmitted over a temporarily reduced transmission bandwidth in a downlink of an LTE network node according to an embodiment.

FIG. 3b illustrates a so-called c-subframe 302b, i.e. a subframe transmitted with a reduced transmission bandwidth α 310b according to one embodiment of the invention. The white areas within the full downlink bandwidth 308b, but outside the reduced transmission bandwidth α 310b, are empty or silent. The reference symbols which would have been transmitted in said white areas of the subframe if the transmission bandwidth would not have been reduced, will not be transmitted when applying a temporarily reduced transmission bandwidth α. Thus, transmission power is saved, since the transmitting network node needs not transmit reference symbols over the full downlink bandwidth. Further, the interference in neighbouring cells will be reduced during the partly silent subframes, due to the reduced transmission power.

The temporarily reduced transmission bandwidth α in a cell should be at least as wide as the measurement bandwidth γ used in the same cell, since otherwise reference signals will not be provided within the entire measurement bandwidth γ, which is needed in order for mobile terminals to be able to compare a current cell to neighbouring cells, as described earlier. Mobile terminals within a cell receive the measurement bandwidth γ provided in the cell in a SIB from a network node, and then perform measurements over the entire γ. If the reference signals would cover only part of γ, the mobile terminals would make incorrect handover evaluations, which could lead to incorrect handover decisions.

Below some embodiments of a method and an arrangement will be described.

Figure 4:
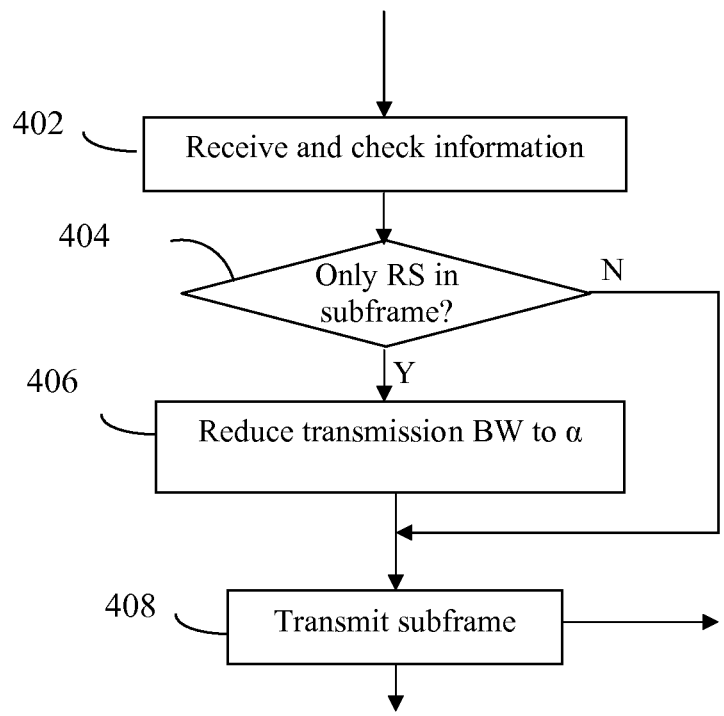
FIG. 4 is a flowchart illustrating an embodiment of procedure steps in a network node.

FIG. 4 is a flowchart, which illustrates procedure steps according to one embodiment in a network node in a cell. Initially, information e.g. user data destined to users camping on the cell, is received 402 e.g. from another network node, or from a management node in the network. Then, the received information is checked 402 for preparation of a next subframe to transmit. Then it is determined 404 if the subframe to be transmitted will carry only reference signals. If not, the subframe is transmitted 408 using the full downlink bandwidth β, and if the subframe is to carry only reference signals, the transmission bandwidth is reduced 406 to a temporarily reduced transmission bandwidth α, which is used when transmitting 408 the subframe.

Figure 5:
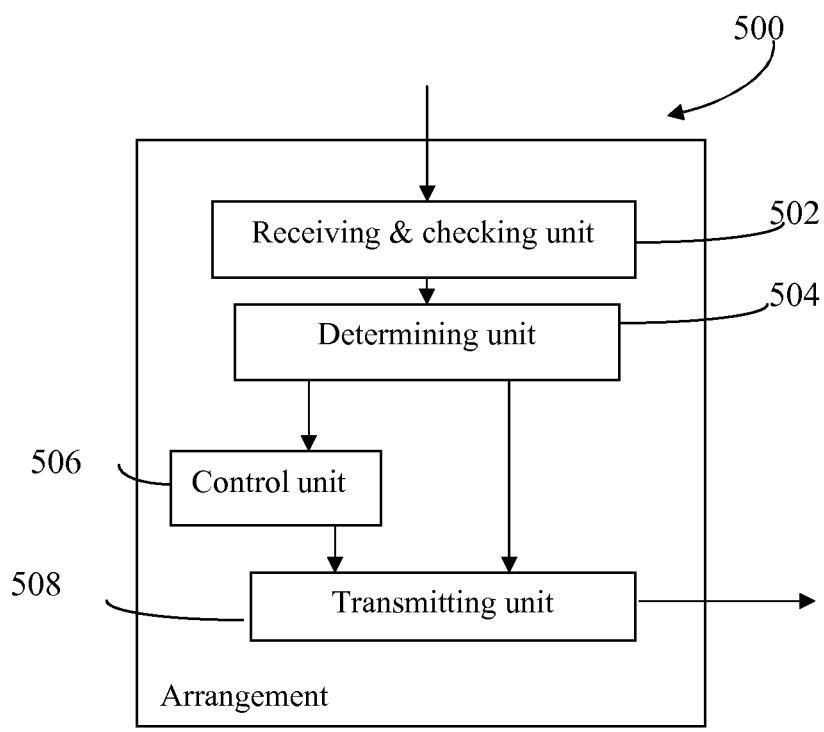
FIGS. 5, 6 and 7 are block diagrams illustrating different embodiments of an arrangement in a network node.
Figure 6:
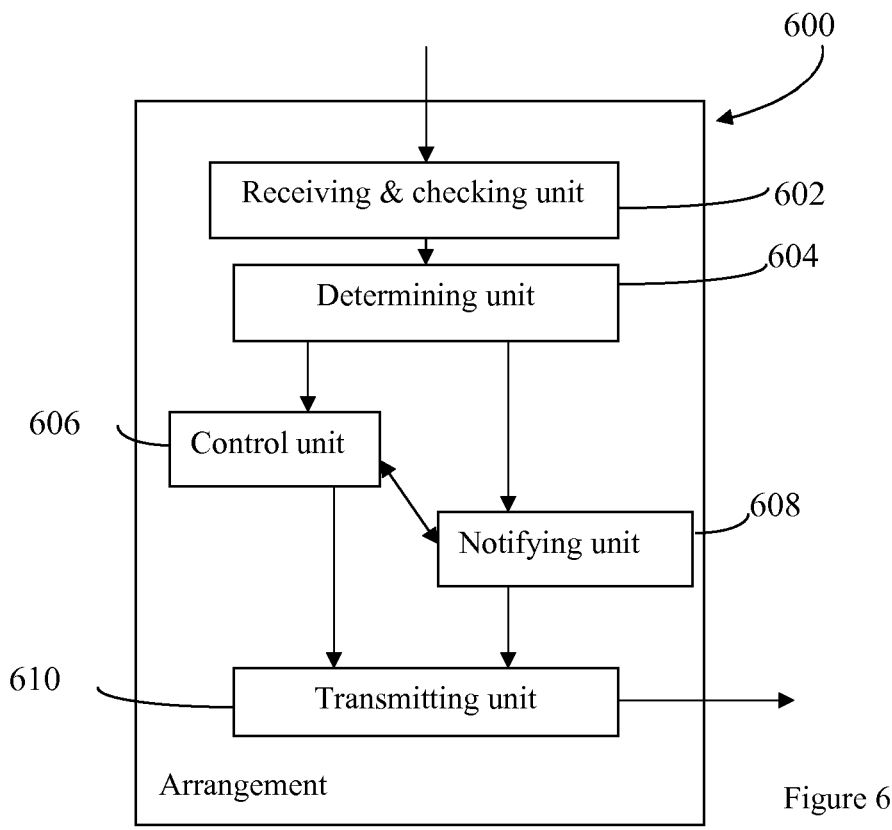

FIG. 5 is a block diagram illustrating an embodiment of an arrangement 500 in a network node. Information e.g. from another network node, or from a management node in the network is received in a receiving and checking unit 502, where the received information is checked for preparation of a next subframe to transmit. Further, it is determined in a determining unit 504 if the subframe to be transmitted will carry only reference signals. If the subframe is to carry only reference signals, the transmission bandwidth is reduced to a temporarily reduced transmission bandwidth α by a control unit 506, whereafter the subframe is transmitted by a transmitting unit 508 using α. In FIG. 6, which illustrates another embodiment of the arrangement, the arrangement 600 further comprises a notifying unit 608, which notifies neighbouring nodes of e.g. which full downlink bandwidth β and/or which measurement bandwidth γ, that is used in the own network node.

Figure 7:
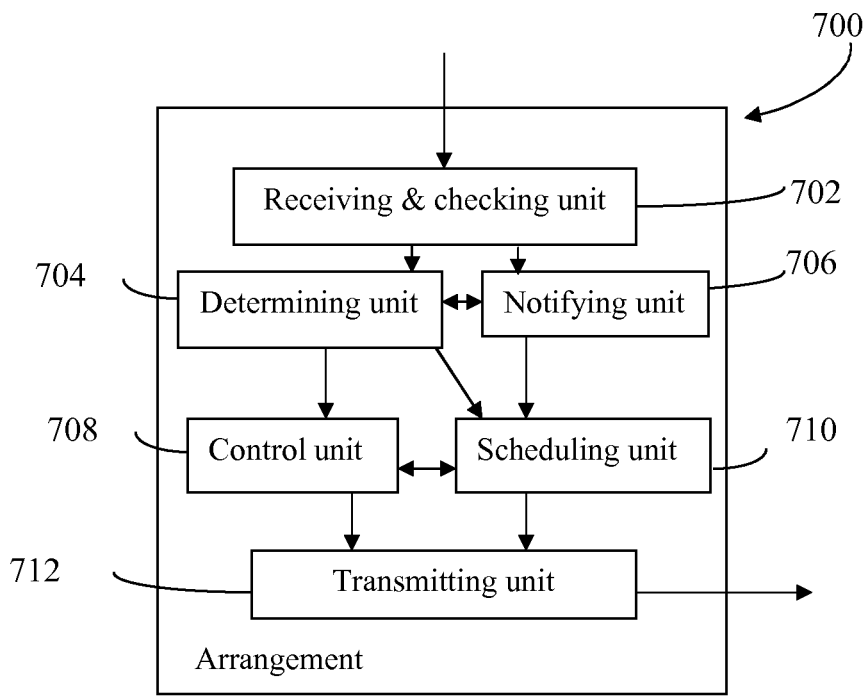

FIG. 7 is a block diagram illustrating an embodiment of an arrangement 700 in a network node, which has a similar receiving and checking unit 702, determining unit 704, notifying unit 706, control unit 708 and transmitting unit 712 to the arrangements illustrated in FIGS. 5 and 6. The arrangement 700 further comprises a scheduling unit 710, which schedules user data to mobile terminals, possibly using a scheduling scheme which takes the scheduling schemes used in a neighbouring network node into account. The information of the scheduling schemes used in a neighbouring network node may be obtained as a notification received by the notifying unit 706.

Figure 11:
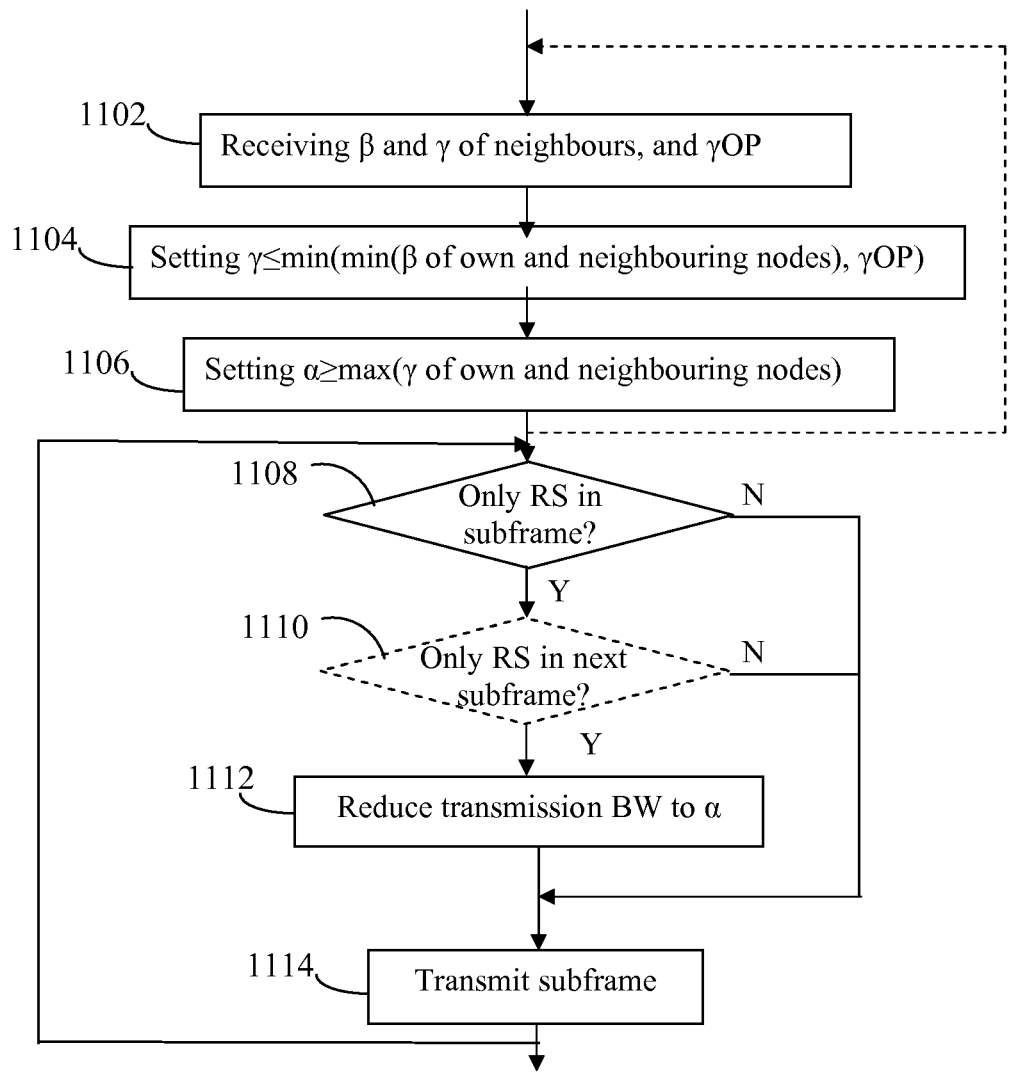
FIG. 11 is a flowchart illustrating an embodiment of procedure steps in a network node.

It should be noted that FIGS. 5-7 merely illustrate various functional units in the arrangements 500, 600 and 700 in a logical sense. However, the skilled person is free to implement these functions in practice using any suitable software and/or hardware means. Thus, the invention is generally not limited to the shown structure of the arrangements 500, 600 and 700. The procedure steps illustrated in FIGS. 4 and 11 are also illustrated in a logical sense.

The amount of transmission power which could be saved by reducing the transmission bandwidth in a certain subframe depends among other things on the difference in bandwidth between the full downlink bandwidth $\beta$ and the temporarily reduced downlink transmission bandwidth a in the subframe. Therefore, the transmission power could be further reduced by increasing this difference. As stated earlier, $\alpha$ should be at least as wide as $\gamma$ in a cell. Therefore, in order to enable a further reduction of the downlink transmission bandwidth $\alpha$, the measurement bandwidth $\gamma$ should be reduced.

Figure 9:
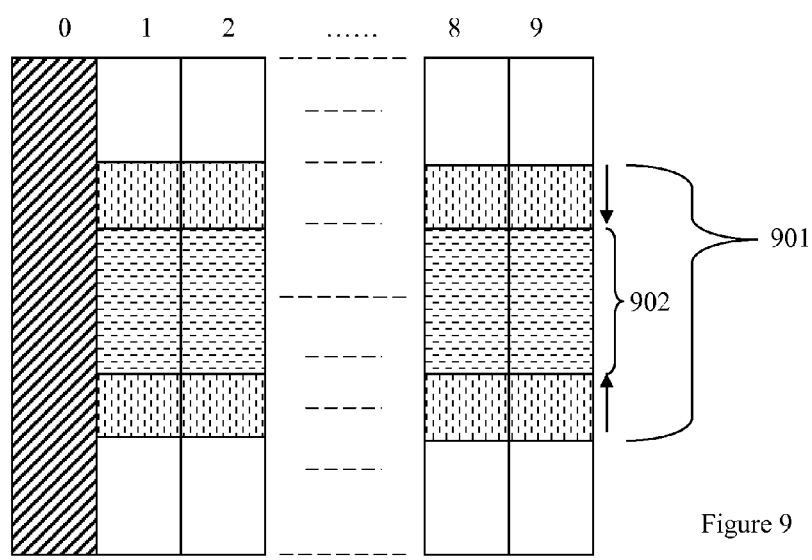
FIG. 9 illustrates different transmission bandwidths according to an embodiment.

In order to save as much transmission power as possible, the measurement bandwidth $\gamma$ should be as narrow as possible considering that it should still enable channel estimation for handover decisions in a reliable way. Conventionally, it is preferred to have a relatively large measurement bandwidth in order for mobile terminals to be able to obtain robust channel estimations. Using a relatively small measurement bandwidth instead of a conventional measurement bandwidth, would not give as robust channel estimates, but would on the other hand enable further power savings; a perspective which is conventionally not considered in connection with the choice of measurement bandwidth. The LTE measurement bandwidth could theoretically be set as low as 1.4 MHz (3GPP TS 36.331), and a plausible value could be approximately 5 MHz. This relatively narrow measurement bandwidth could be set by the operator of a network, and be distributed to all network nodes e.g. when the described bandwidth reducing method should be activated, when downlink bandwidth of a cell is changed or when a new cell is added to the network. This centrally set and relatively narrow measurement bandwidth will therefore also be referred to in this document as the measurement bandwidth $\gamma$OP, where OP stands for OPerator. FIG. 9 shows an example of a reduced measurement bandwidth $\gamma$OP 902 according to one possible embodiment, in relation to e.g. a default measurement bandwidth $\gamma_{Default}$ 901 which would have been provided if $\gamma$OP was not set by the operator.

In a homogenous cellular communication system, where all cells have the same full downlink bandwidth $\beta$, e.g. 20 MHz, the measurement bandwidth $\gamma$ will be equally wide in all cells. If $\gamma$OP<$\beta$ the measurement bandwidth $\gamma$ in each cell will be set to $\gamma$OP, i.e. $\gamma=\gamma$OP. Since $\gamma$ is equally wide in all cells, the temporarily reduced downlink transmission bandwidth $\alpha$ could be set to equal $\gamma$ in all cells, i.e. $\alpha=\gamma=\gamma$OP, provided that $\gamma$OP<$\beta$. However, all cellular communication systems are not homogenous.

In inhomogeneous cellular communication system there may be cells, which have a total downlink bandwidth $\beta$, which is more narrow than $\gamma$OP, i.e. $\beta<\gamma$OP. In such a cell, $\gamma$ cannot be set to $\gamma$OP, as $\gamma$OP is wider than the full downlink bandwidth. The measurement bandwidth $\gamma$ for such a cell in which $\beta<\gamma$OP and its neighbour cells should be set to the most narrow of the full downlink bandwidth of the own cell and the full downlink bandwidths of the neighbouring cells, or to a value less than any of the measurement bandwidths. Generally in a network, the measurement bandwidth $\gamma$ to be set in a network node in a cell could be described as being equal to or more narrow than the most narrow of: the full downlink bandwidth of the own cell; the full downlink bandwidths of the neighbouring cells; and, the preconfigured measurement bandwidth $\gamma$OP, i.e. $\gamma \leq \min(\gamma\text{OP}, \min(\beta_i \text{ of own and neighbouring cells}))$. If $\gamma$OP is e.g. 5 MHz and the total downlink bandwidth $\beta$ of a cell is 1.6 MHz, the measurement bandwidth $\gamma_1$ for said cell and its neighbours will be equal to or less than min(5 MHz, 1.6 MHz)=1.6 MHz, provided that 1.6 MHz is the most narrow full downlink bandwidth among the neighbours. In other words, in some narrow cells the measurement bandwidth $\gamma$ will equal the full downlink bandwidth $\beta$, and consequently, the transmission bandwidth in such a cell may not be temporarily reduced at transmission of a subframe carrying only reference signals.

In the previous examples it has been assumed that all cells in the network have the ability to apply the described bandwidth-reducing procedure. If there is a cell in the network, which cannot apply the described procedure, henceforth called an unable cell, this cell may neither reduce its measurement bandwidth $\gamma$ to $\gamma$OP according to any embodiment of the invention, nor reduce its transmission bandwidth during transmission of subframes carrying only reference signals. In the unable cell, $\gamma$ will probably be set to a default measurement bandwidth, i.e. min($\beta$ of own and neighbouring cells). If the unable cell and its neighbours have $\beta$=20 MHz, the measurement bandwidth $\gamma$ will be set to 20 MHz. The temporarily reduced transmission bandwidth of a cell must be set to a value that is equal to or greater than the largest one of the measurement bandwidth $\gamma$ of the cell and the measurement bandwidths $\gamma_i$ of the neighbouring cells of the cell, due to that all cells must be able to provide reference signals over the whole measurement bandwidth of their own and over the whole measurement bandwidths of their neighbouring cells. The transmission bandwidths of the cells neighbouring the unable cell can therefore not be reduced below 20 MHz. The temporarily reduced transmission bandwidth $\alpha$ in a cell may also generally be expressed as $\alpha \geq \max(\gamma_i \text{ of own and neighbouring cells})$, i.e. wider than or equal to the widest of the measurement bandwidth $\gamma$ in the own cell and the measurement bandwidths $\gamma_i$ of the neighbouring cells of the cell.

To summarise what is exemplified above: The measurement bandwidth $\gamma$ and a temporarily reduced transmission bandwidth $\alpha$ in a cell applying the above described procedure according to one embodiment could be set as follows:

1. Obtain $\gamma$OP and full downlink bandwidth $\beta$ of neighbouring cells.
2. Set measurement bandwidth $\gamma$ to $\gamma \leq \min(\gamma\text{OP}, \min(\beta$ of own and neighbouring cells)),
3. Obtain measurement bandwidth $\gamma$ of neighbouring cells,
4. Set temporarily reduced transmission bandwidth $\alpha$ to $\alpha \geq \max(\gamma$ of own and neighbouring cells)

The above examples will now be further explained in connection with FIG. 10. The exemplary inhomogeneous cellular system shown in FIG. 10 comprises five cells, cells A-E. Cells A-D apply an embodiment of the invention, and cell E does not apply the invention. Cells A-C and E have full downlink bandwidths $\beta$ of 20 MHz, and cell D has a full downlink bandwidth $\beta$ of 3 MHz. In order for cells A-D to be able to set their measurement bandwidth $\gamma$ to a value which enables mobile terminals within the cells to compare the current cell to a neighbouring cell, the cells A-D must obtain information on the full downlink bandwidths of the neighbouring cells. For example, cell A in FIG. 10 should obtain information concerning the full downlink bandwidth $\beta_i$ of cells B and C; and cell B should obtain information on the full downlink bandwidth $\beta_i$ of cells A, C and E, etc. Further, cells A-D should obtain information on the preconfigured measurement bandwidth, $\gamma$OP, which is set e.g. by the operator. Cells A-D may then set their measurement bandwidth $\gamma_1$, in consideration of said obtained information, to the minimum value of the respective full downlink bandwidths $\beta_i$ of the own and the neighbouring cells or the preconfigured measurement bandwidth, $\gamma$OP. The measurement bandwidth $\gamma$ of a cell could be mathematically expressed as $\gamma \leq \min(\gamma OP, \min(\beta_i$ of own and neighbouring cells)). In the example system in FIG. 10, cell B will set its measurement bandwidth $\gamma_B$ to $\min(\gamma OP=5$ MHz, $\min(\beta_A=20$ MHz, $\beta_B=20$ MHz, $\beta_C=20$ MHz, $\beta_E=20$ MHz))= $\gamma OP=5$ MHz. Cell C will set its measurement bandwidth $\gamma_C$ to $\min(\gamma OP=5$ MHz, $\min(\beta_A=20$ MHz, $\beta_B=20$ MHz, $\beta_C=20$ MHz, $\beta_D=3$ MHz))=$\beta_D=3$ MHz. In cell E, the measurement bandwidth $\gamma_E$ will be set to $\gamma_{Default}$ by the operator, i.e. to be equally wide as the most narrow of the full downlink bandwidths of the own and the neighbouring cells, i.e. $\gamma_E=\min(\beta_i$ of own and neighbouring cells), i.e. $\gamma_E=\min(\beta_B=20$ MHz, $\beta_E=20$ MHz)=20 MHz.

Further, in order for cells A-D to be able to set their temporarily reduced transmission bandwidths $\alpha_i$ to a value, which will provide the neighbouring cells with reference signals within their entire measurement bandwidths $\gamma_i$, the cells A-D must obtain information on the measurement bandwidths $\gamma_i$ used in the neighbouring cells. The cells A-D will then set their temporarily reduced transmission bandwidth $\alpha_i$ equal to or greater than the widest of the measurement bandwidths $\gamma_i$ used by the own cell and the neighbouring cells. The temporarily reduced transmission bandwidth $\alpha$ of a cell could be mathematically expressed as $\alpha \geq \max(\gamma_i$ of own and neighbouring cells). In cell C, $\alpha_C=\max(\gamma_A=5$ MHz, $\gamma_B=5$ MHz, $\gamma_C=3$ MHz, $\gamma_D=3$ MHz)=5 MHz; and in cell B, $\alpha_B=\max(\gamma_A=5$ MHz, $\gamma_B=5$ MHz, $\gamma_C=3$ MHz, $\gamma_E=20$ MHz)=20 MHz. In cell E, no temporarily reduced measurement bandwidth $\alpha$ will be set.

Figure 10:
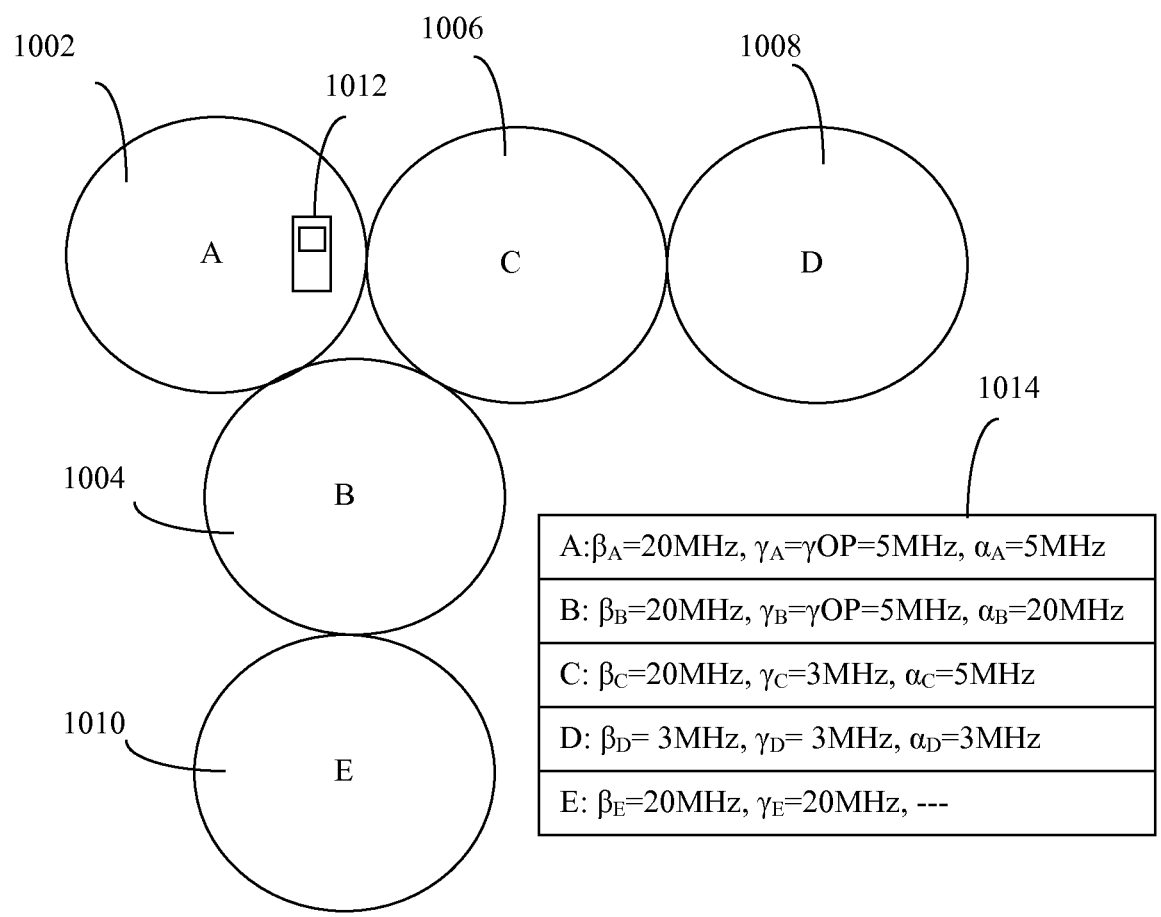
FIG. 10 illustrates five cells in a network and how they affect neighbouring cells.

The table 1014 in FIG. 10 shows $\alpha$, $\beta$ and $\gamma$ for the cells A-E. The process of setting $\alpha$ and $\gamma$ in the different cells may have to be iterated in order for the cells to obtain stable values of $\alpha$ and $\gamma$. In the example in FIG. 10, two of the cells applying the method will be able to reduce the transmission bandwidth during transmission of subframes carrying only reference signals, i.e. cell A and cell C, in which the transmission bandwidth will be reduced by 15 MHz for a c-subframe. In cells B and D, the temporarily reduced transmission bandwidth $\alpha_i$ will not be applied, since $\alpha_i$ is equally wide as the full downlink bandwidths $\beta_i$ of the cells, i.e. $\alpha_B \Leftrightarrow \beta_B=20$ MHz and $\alpha_D \Leftrightarrow \beta_D=3$ MHz.

A mobile terminal 1012 camping on cell A will receive $\gamma_A$ in a SIB from a network node in cell A. The mobile terminal will then perform measurements on reference signals transmitted within the bandwidth $\gamma_A$ from the network node in the current cell, and from a network node in at least one neighbouring cell, in order to compare the current cell to the at least one neighbouring cell.

FIG. 11, which is a flow chart, illustrates one embodiment of the described bandwidth-reducing procedure. Initially, the full downlink bandwidth $\beta_i$ and the measurement bandwidth $\gamma_i$ of the neighbouring cells, and $\gamma$OP are obtained 1102 from neighbouring network nodes and/or from a management node. Alternatively, $\gamma_i$ of the neighbouring cells are not obtained until after the setting 1104 of $\gamma$ in the current cell. Further, the measurement bandwidth $\gamma$, which will be broadcasted in the SIB within the cell, is set 1104 equal to or lower than the narrowest bandwidth among the full downlink bandwidths $\beta_i$ of the current cell and the neighbouring cells, and the preconfigured measurement bandwidth $\gamma$OP. Further, the temporarily reduced transmission bandwidth $\alpha$ is set 1106 equal to or greater than the widest bandwidth among the measurement bandwidths $\gamma_i$ of the current cell and the neighbouring cells. In order to achieve stable values of $\gamma$ and $\alpha$, these steps in the procedure may need to be repeated, which is illustrated as a dashed arrow. Then, information is received and checked as described earlier in this document, but not shown in FIG. 11. Thereafter, it is determined 1108 whether a subframe to be transmitted within the current cell will be carrying only reference signals. If the subframe will be carrying other information than reference signals, the subframe is transmitted 1114 using the full downlink bandwidth $\beta$. If the subframe will be carrying only reference signals, the subframe is transmitted 1114 using a reduced 1112 transmission bandwidth $\alpha$. It could also be determined 1110 if the subframe precedes another subframe, which also will be carrying only reference signals, and if that is found to be the case, the subframe is transmitted using $\alpha$, and if not, the subframe is transmitted using $\beta$.

Returning again to the subframe perspective.

Figure 12:
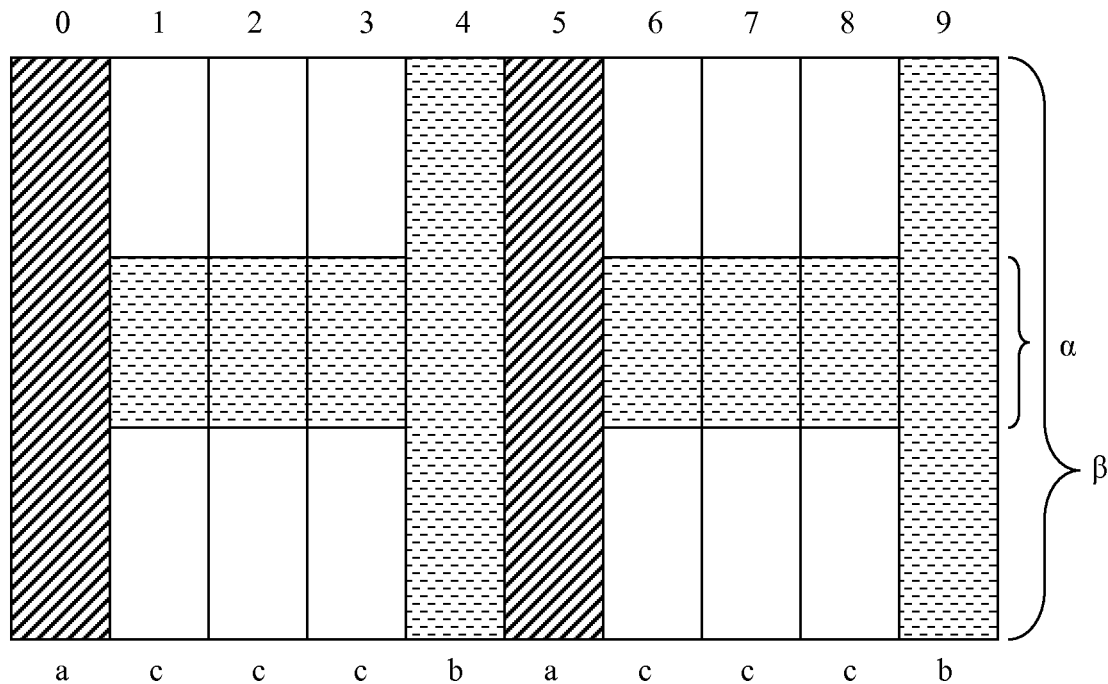
FIG. 12 illustrates a-, b- and c-subframes being transmitted over different bandwidths in a radio frame according to an embodiment.

If a subframe carrying data or control information other than reference signals, i.e. an a-subframe, is preceded by one or more subframes with reference signals only within the temporarily reduced transmission bandwidth $\alpha$, i.e. c-subframes, an intended receiver of the a-subframe may not be able to obtain a sufficiently good channel estimate in order to receive the a-subframe in a satisfactory way. This could be addressed by assuring that a subframe preceding an a-subframe is not transmitted with a temporarily reduced transmission bandwidth. In order to achieve that an a-subframe will be preceded by a b-subframe, it should be determined that a first subframe carrying only reference signals in a radio frame to be transmitted, precedes a second subframe carrying only reference signals, before the first subframe may be transmitted with a temporarily reduced transmission bandwidth $\alpha$. FIG. 12 illustrates a radio frame where such a determination step is applied, according to one embodiment of the invention. In FIG. 12 the a-subframes are preceded by a b-subframe carrying reference signals over approximately the whole downlink bandwidth $\beta$, while other subframes, which only carry reference signals and do not precede an a-subframe, are transmitted with a reduced transmission bandwidth $\alpha$ as c-subframes.

The synchronisation signals and the broadcast data in an LTE cell are, as mentioned earlier, currently placed as follows within a radio frame:
PSS and SSS occur in subframes 0 and 5 of a radio frame,
PBCH occurs in subframe 0,
SIB1 occurs in subframe 5
PDCCH and DL-SCH occur in a-subframes, and in case of zero traffic load, they are equal to SIBs.

The remaining SIBs can be freely scheduled by RRC.

Figure 13:
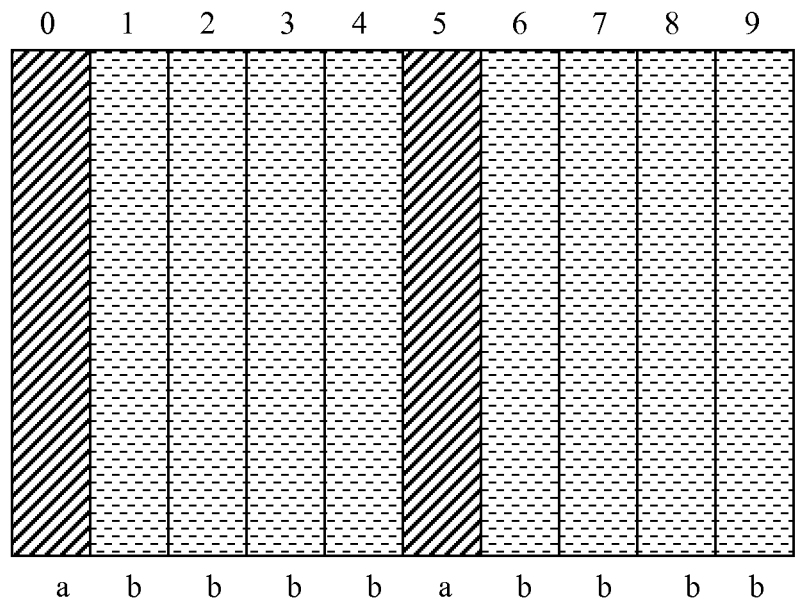
FIG. 13 illustrates control information concentrated to a few subframes of a radio frame according to an embodiment.

Thus, subframes 0 and 5 of an LTE radio frame are so called a-subframes, independently of the traffic in the cell. If the broadcast information, which could be freely scheduled within a radio frame, also were to be scheduled in subframes 0 and/or 5, this would entail that eight out of ten subframes of a radio frame would carry only reference signals at zero traffic load, as illustrated in FIG. 13, which would maximise the amount of subframes which could be transmitted with a temporarily reduced transmission bandwidth $\alpha$, and thereby maximise the possibility to save power. Alternatively, all or some of the freely schedulable broadcast information could be concentrated to one or more subframes other than subframes 0 and 5, depending on what would be convenient, but with an ambition to maximise the amount of subframes with a temporarily reduced transmission bandwidth α.

Figure 14:
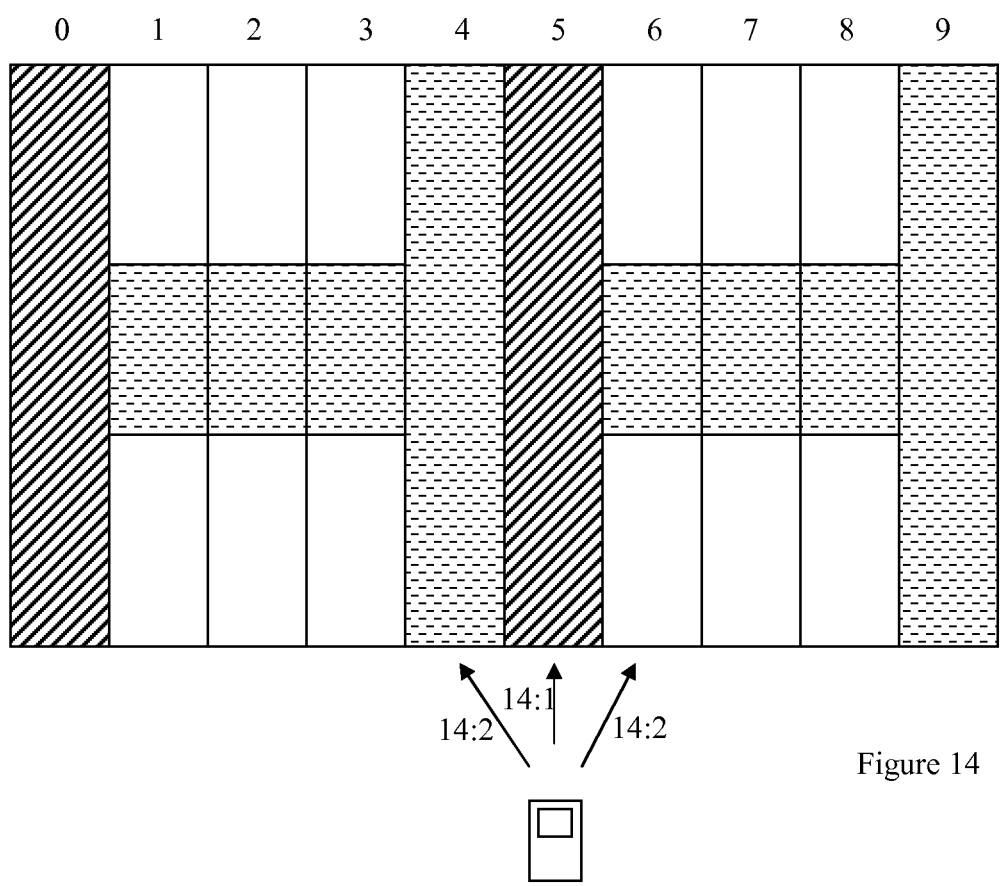
FIGS. 14 and 15 illustrate different scheduling strategies according to different embodiments of the invention.

Below, different embodiments of the above described bandwidth reducing procedure at increasing traffic load will be described:

When the traffic load in a cell increases by that e.g. a mobile terminal, which is actively engaged in communication of data, enters the cell from a neighbouring cell, data destined to this mobile terminal should be scheduled by a network node in the cell, such as an eNB or a relay node. Network nodes normally have a scheduling strategy, but until now, the previously described bandwidth reducing procedure has not had to be considered in these strategies. A scheduling strategy according to one embodiment of the invention is to schedule data destined to a mobile terminal in one or more a-subframes, in which there are resources left to allocate, see alternative 14:1 in FIG. 14. This strategy does not create additional a-subframes, and thereby maximises the amount of potential c-subframes. If capacity of the a-subframes are fully utilised, the strategy according to one embodiment of the invention would be to schedule the data destined to the mobile terminal in a subframe adjacent to an a-subframe, which is illustrated as alternative 14:2 in FIG. 14. This strategy is favourable in embodiments where the subframe preceding an a-subframe should be a b-subframe as in FIG. 14, since the strategy minimises the amount of subframes preceding a-frames, and thereby maximises the amount of subframes carrying only reference signals for which the transmission bandwidth may be reduced.

Below, embodiments of the invention considering the scheduling schemes of neighbouring nodes will be described.

Figure 15:
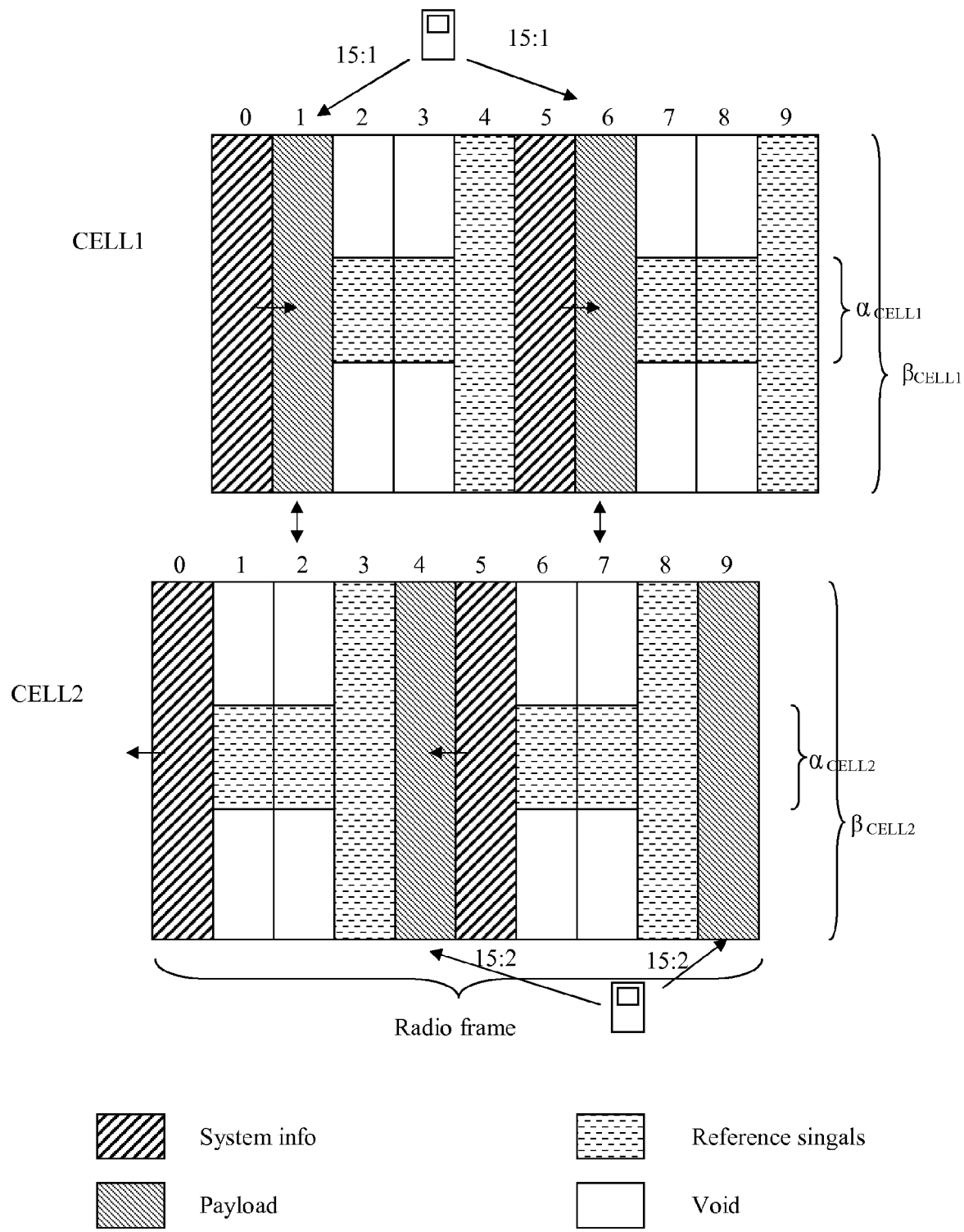

The system load and scheduling strategy in a neighbouring cell may be relevant when selecting a scheduling strategy in a cell, since the transmissions in a neighbouring cell causes interference in the own cell, and vice versa. In order to avoid the interference from a neighbouring cell, it is desirable to transmit in the own cell when the neighbour cell is relatively quiet, as for example when the neighbour is transmitting a b-subframe or even better, a c-subframe. In FIG. 15, an example of a scheduling strategy according to one embodiment of the invention, which takes the transmissions in a neighbouring cell into account, can be seen. FIG. 15 illustrates two radio frames, transmitted in the two neighbouring cells CELL1 and CELL2, respectively. At least one of CELL1 or CELL2 has information on the transmission strategies of the other cell, and has adapted its transmissions in order to make use of periods of low interference from the neighbour cell. In CELL2, payload is scheduled to fill the subframes in a certain order, for example consecutively starting from subframe 0 or from subframe 9 of a radio frame. If CELL1 has knowledge about this, it will schedule payload in some other order or direction, which differs from the order or direction used in CELL2. This scheduling strategy could, at least initially, avoid that a-subframes in CELL1 coincide with a-subframes in CELL2. For example, if CELL2 fills the subframes of a radio frame starting from a subframe preceding and a-subframe and proceeding in a backwards or descending direction, illustrated by an arrow in FIG. 15; CELL1 will fill its subframes in a forward or ascending direction starting from a subframe succeeding an a-subframe. These strategies are illustrated by the arrows 15:1 and 15:2 in FIG. 15, and could mitigate the interference between the cells until the cells, e.g. for capacity reasons, need to use subframes coinciding in time.

In order for a network node to be able to adapt e.g. the scheduling strategy in a cell to the conditions in a neighbouring cell, the network node must have information on the conditions in the neighbouring cell. This could be achieved in a number of ways, such as that the cell, or strictly speaking, a network node performing scheduling in the cell, could be explicitly or implicitly notified by e.g. broadcast information or explicit signalling from another node; or the network node could perform measurements on the transmissions in neighbouring cells. The scheduling strategies could also be specified in a standard.

One way of further maximising the amount of c-subframes, would be to refrain from transmitting data to a user until the data destined to the user fills a whole subframe. In this way, the capacity of the a-subframes will be fully utilised, and thereby minimise the amount of a-frames needed in order to transmit a certain amount of user data. The cost for the user will be a marginally increased delay.

The transmission of c-subframes in a cell will affect the reliability of the CQI (Channel Quality Indicator) reports from a mobile terminal camping on the cell. CQI reports concerning Resource Blocks outside the temporarily reduced transmission bandwidth α will be less reliable, since channel estimates made during c-subframes may be misleading. The reduced reliability could e.g. be addressed either by suppressing the use of CQI reports concerning Resource Blocks outside the temporarily reduced transmission bandwidth α when the amount of c-subframes exceeds a predetermined threshold, or by assigning a reduced reliability to, or in other ways adjusting the CQI reports concerning Resource Blocks outside the measurement bandwidth, based on the amount of c-frames transmitted.

The traffic load in a cell will vary over time, and the amount of power which could be saved by using an embodiment of the described procedure varies with the load. The lower the load, the more transmission power could be saved. FIG. 17 shows a table, similar to the table in FIG. 16, however, the table in FIG. 17 shows the percentage of control signal symbols in the total amount of symbols in a radio frame when applying an embodiment of the invention using a reduced transmission bandwidth α of 5 MHz for transmission of c-subframes. The figures in the table in FIGS. 16 and 17 are valid for an LTE cell with 20 MHz downlink bandwidth, 1 TX antenna and 3 PDCCH symbols per subframe. The figures which are impacted by the application of an embodiment of the invention are written in bold characters as can be seen from comparison with the corresponding figures in FIG. 16. In this cell, according to the figures in the table, it does not appear to be worthwhile to use the described energy saving procedure for traffic load levels exceeding 75% of a maximum traffic load.

In order to apply the described energy saving procedure only when it is determined to give a desired result, e.g. at certain traffic load levels below the maximum traffic load, a traffic criterion could be introduced. As an example, if the system or cell traffic load is below a certain threshold, a network node may apply an embodiment of the described procedure.

It will now be discussed how much energy that can be saved with reference to various situations that may occur in practice.

Assuming that the maximal transmission power is 60 W, each symbol in a radio frame will use a transmission power of 60/168,000 W/symbol, which equals 0.375 mW/symbol. Also assuming, in order to simplify calculation, that the traffic load in the example cell is 100% during 50% of the time, and 0% during the remaining 50% of the time, the average saved transmission power per cell over 24 h will be (40000−36400)/2*0.357 mW=0.643 W.

For a Radio Unit of 60 W, the typical power cost for each transmitted watt is 250/60 W/W=4.167 W/W, which gives that the saved power for an LTE cell during a year will be 0.643*4.167*24*365=23.5 kWh.

For a network comprising 10000 base stations, each covering 3 cells, the saved power will be 30000*23.5 kWh=705 MWh.

Naturally there may be other network functions as well, which must be considered when applying the described procedure. For example, no data should be scheduled in an uplink frame such that HARQ (Hybrid Automatic Repeat ReQuest) feedback is expected in a downlink b- or c-subframe. Further, no mobile terminal should be configured to wake up from a Discontinuous Reception (DRX) state during b- or c-subframes. Further, no mobile terminal should be configured to listen to a page on the PCH (Paging Channel) during such a subframe. These and other issues could be coordinated by e.g. an eNB in a cell without explicitly informing mobile terminals camping on the cell or being about to be handed over to the cell. The mobile terminals camping on the cell or being about to be handed over to the cell do not need to have information on the possibility that subframes carrying only reference signals are transmitted over a reduced transmission bandwidth.

The described invention is intended to be used in a cell of which the cell capacity is not fully utilised, since if the capacity in a cell is fully utilised, all subframes will carry information other than reference signals, and thereby the transmission bandwidth will not be reduced during the transmission of any subframes when applying an embodiment of the invention.

While the invention has been described with reference to specific example embodiments, the description is in general only intended to illustrate the inventive concept and should not be taken as limiting the scope of the invention. The different features of the exemplary embodiments above may be combined in different ways according to need, requirements or preference. Although the description has mainly described operations on a subframe level, the scope of the invention is not limited hereto, but could also e.g. be applied on a slot level. Further, the description has mainly referred to an LTE scenario, but the invention may also be applied in other similar systems, such as e.g. WiMax. The invention is generally defined by the following independent claims.

The invention claimed is:

1. A method of transmitting reference signals in subframes in a radio frame in a cellular communication system comprising at least a first network node in a first cell providing a first measurement bandwidth $\gamma_f$, which is more narrow than a first full downlink bandwidth $\beta_f$ of said first network node, the method comprising:
    determining whether a subframe to be transmitted will be carrying only reference signals; and
    reducing the transmission bandwidth to a temporarily reduced transmission bandwidth α during transmission of said subframe when carrying only reference signals;
    wherein the temporarily reduced transmission bandwidth α of the subframe is at least equally wide as the first measurement bandwidth $\gamma_f$ provided by the first network node, and more narrow than the first full downlink bandwidth $\beta_f$ of the first network node.

2. The method of claim 1, further comprising:
    obtaining information on at least one of a second full downlink bandwidth $\beta_s$, and a second measurement bandwidth $\gamma_s$ of a second network node in a cell that is a neighbor of said first cell; and
    wherein said obtained information is considered when the first measurement bandwidth $\gamma_f$ and the temporarily reduced transmission bandwidth α are set in the first network node; and
    wherein the temporarily reduced transmission bandwidth α is at least equally wide as the widest of said first and second measurement bandwidths.

3. The method of claim 1, wherein at least one neighboring node is notified of at least one of the first full downlink bandwidth $\beta_f$ and the first measurement bandwidth $\gamma_f$, that are used in the first network node.

4. The method of claim 1, wherein the first measurement bandwidth $\gamma_f$ in the first network node is set to a value less than or equal to the smallest of:
    the first full downlink bandwidth $\beta_f$ of the first network node, and
    a second full downlink bandwidth $\beta_s$ of a second network node in a second cell that is a neighbor of said first cell; and
    a preconfigured measurement bandwidth γOP, where γOP is a preconfigured value.

5. The method of claim 4, wherein the preconfigured measurement bandwidth γOP is approximately 5 MHz.

6. The method of claim 1, wherein the step of reducing the transmission bandwidth to the temporarily reduced transmission bandwidth α is performed for said subframe when preceding a subframe carrying only reference signals.

7. The method of claim 1, wherein system control information other than reference signals is concentrated to a predetermined number of subframes of the radio frame to be transmitted by the first network node.

8. The method of claim 7, wherein the predetermined number of subframes is two subframes.

9. The method of claim 1, wherein a mobile terminal, which is to be scheduled by the first network node for reception of information other than reference signals, is scheduled in at least one of:
    one or more subframes already comprising information other than reference signals; and
    a subframe adjacent to said at least one subframe already comprising information other than reference signals, when the capacity of said at least one subframe already comprising information other than reference signals is fully utilized.

10. The method of claim 1, wherein one or more network nodes neighboring the first network node are notified of how mobile terminals are scheduled within the first network node.

11. The method of claim 10, wherein the first network node is notified of a scheduling scheme used in at least one neighboring network node, and wherein the scheduling scheme of the first network node is adapted based on the scheduling scheme in the at least one neighboring network node.

12. The method of claim 11, wherein the scheduling scheme in the first network node is configured to schedule a mobile terminal in a first subframe, coinciding in time with a second subframe carrying no information other than reference signals, which second subframe is transmitted by the at least one neighboring network node.

13. The method of claim 11, wherein the scheduling scheme in the first network node is configured to schedule mobile terminals on the opposite side of subframes carrying information other than reference signals, relative the side of subframes carrying information other than reference signals, on which mobile terminals are scheduled in said at least one neighboring network node.

14. The method of claim 1, wherein a mobile terminal, which is to be scheduled by the first network node for reception of information other than reference signals, is scheduled when the information destined to the mobile terminal fills one subframe.

15. The method of claim 1, wherein the method is applied when a traffic load of said first network node is below a predetermined threshold.

16. The method of claim 1, wherein the first network node uses CQI reports received from mobile terminals for selecting a transmission mode, and wherein the CQI reports concerning Resource Blocks outside the temporarily reduced transmission bandwidth a are adjusted, based on the amount of subframes being transmitted over the temporarily reduced transmission bandwidth.

17. The method of claim 1, wherein the first network node uses CQI reports received from mobile terminals for selecting a transmission mode, and wherein the use of CQI reports concerning Resource Blocks outside the temporarily reduced transmission bandwidth a is suppressed when the amount of subframes being transmitted over the temporarily reduced transmission bandwidth, exceeds a predetermined threshold.

18. An arrangement configured to transmit reference signals in subframes in a radio frame in a cellular communication system comprising at least a first network node in a first cell providing a first measurement bandwidth $\gamma_f$, which is more narrow than a first full downlink bandwidth $\beta_f$ of said first network node, the arrangement comprising:
 a determining unit configured to determine whether a subframe to be transmitted will be carrying only reference signals; and
 a control unit configured to reduce the transmission bandwidth to a temporarily reduced transmission bandwidth a during transmission of said subframe when carrying only reference signals;
 wherein the temporarily reduced transmission bandwidth α is at least equally wide as the first measurement bandwidth $\gamma_f$ provided by the first network node, and more narrow than the first full downlink bandwidth $\beta_f$ of the first network node.

19. The arrangement of claim 18, wherein the control unit is further configured to obtain information on at least one of a second full downlink bandwidth $\beta_s$ and a second measurement bandwidth $\gamma_s$ of a second network node in a cell that is a neighbor of said first cell; and
 wherein the control unit is further configured to consider said obtained information when setting the first measurement bandwidth $\gamma_f$ and the temporarily reduced transmission bandwidth α; and
 wherein the temporarily reduced transmission bandwidth α is at least equally wide as the widest of said first and second measurement bandwidths.

20. The arrangement of claim 18, wherein the arrangement further comprises a notifying unit configured to notify at least one neighboring node of at least one of the first full downlink bandwidth $\beta_f$ and the first measurement bandwidth $\gamma_f$ that is used in the first network node.

21. The arrangement of claim 18, wherein the control unit is further configured to set the first measurement bandwidth $\gamma_f$ to a value smaller than or equal to the smallest of:
 the first full downlink bandwidth $\beta_f$ of the first network node, and
 a second full downlink bandwidth $\beta_s$ of a second network node in a second cell that is a neighbor of said first cell, and
 a preconfigured measurement bandwidth γOP, where γOP is a preconfigured value.

22. The arrangement of claim 18, wherein the control unit is further configured to reduce the transmission bandwidth for said subframe to the temporarily reduced transmission bandwidth a when preceding a subframe carrying only reference signals.

23. The arrangement of claim 18, wherein the control unit is further configured to concentrate system control information other than reference signals to a predetermined number of subframes of the radio frame to be transmitted.

24. The arrangement of claim 18, further comprising a scheduling unit configured to schedule transmissions to a mobile terminal in at least one of:
 one or more subframes already comprising information other than reference signals; and
 a subframe adjacent to said at least one subframe already comprising information other than reference signals, when the capacity of said at least one subframe already comprising information other than reference signals is fully utilized.

25. The arrangement of claim 24, wherein the notifying unit is further configured to notify at least one network node neighboring the first network node of how mobile terminals are scheduled within the first network node.

26. The arrangement of claim 25, wherein the notifying unit is further configured to receive a notification of a scheduling scheme used in at least one neighboring network node, and wherein the scheduling unit is further configured to adapt its scheduling scheme based on the scheduling scheme used in the at least one neighboring network node.

27. The arrangement of claim 26, wherein the scheduling unit is further configured to schedule a mobile terminal in a first subframe, coinciding in time with a second subframe carrying no information other than reference signals, which second subframe is transmitted by said at least one neighboring network node.

28. The arrangement of claim 26, wherein the scheduling unit is further configured to schedule mobile terminals on the opposite side of subframes carrying information other than reference signals, relative the side of subframes carrying information other than reference signals, on which mobile terminals are scheduled in said at least one neighboring network node.

29. The arrangement of claim 18, wherein the arrangement is further configured to schedule transmissions to a mobile terminal when the information destined to the mobile terminal fills one subframe.

30. The arrangement of claim 18, wherein the arrangement is further configured to be used in said first network node when a current traffic load is below a predetermined threshold.

31. The arrangement of claim 18, wherein the control unit is further configured to adjust CQI reports concerning Resource Blocks outside the temporarily reduced transmission bandwidth α, based on the amount of subframes being transmitted over the temporarily reduced transmission bandwidth, and wherein the CQI reports are received from mobile terminals, and used by the network node for selecting a transmission mode.

32. The arrangement of claim 18, wherein the control unit is further configured to suppress the use of CQI reports concerning Resource Blocks outside the temporarily reduced transmission bandwidth α when the amount of subframes being transmitted over the temporarily reduced transmission bandwidth α, exceeds a predetermined threshold.

* * * * *